(12) United States Patent
Alenljung et al.

(10) Patent No.: US 10,481,249 B2
(45) Date of Patent: Nov. 19, 2019

(54) RADAR APPARATUS

(71) Applicant: DENSO CORPORATION, Kariya, Aichi-pref. (JP)

(72) Inventors: Klas Alenljung, Gothenburg (SE); Yoshihiro Abe, Gothenburg (SE)

(73) Assignee: DENSO CORPORATION, Kariya, Aichi-pref. (JP)

( * ) Notice: Subject to any disclaimer, the term of this patent is extended or adjusted under 35 U.S.C. 154(b) by 353 days.

(21) Appl. No.: 15/322,856

(22) PCT Filed: Jul. 1, 2015

(86) PCT No.: PCT/JP2015/003319
§ 371 (c)(1),
(2) Date: Dec. 29, 2016

(87) PCT Pub. No.: WO2016/002221
PCT Pub. Date: Jan. 7, 2016

(65) Prior Publication Data
US 2017/0139042 A1 May 18, 2017

(30) Foreign Application Priority Data

Jul. 4, 2014 (EP) .................................... 14175851

(51) Int. Cl.
*G01S 13/44* (2006.01)
*G01S 13/34* (2006.01)
(Continued)

(52) U.S. Cl.
CPC ........ *G01S 13/4454* (2013.01); *G01S 7/2921* (2013.01); *G01S 7/354* (2013.01);
(Continued)

(58) Field of Classification Search
CPC ...... G01S 13/34; G01S 13/42; G01S 13/4454; G01S 13/931; G01S 2013/9346; G01S 3/74; G01S 7/2921; G01S 7/354
(Continued)

(56) References Cited

U.S. PATENT DOCUMENTS

2011/0057831 A1* 3/2011 Shinomiya ................ G01S 3/74
342/74
2011/0074620 A1 3/2011 Wintermantel
(Continued)

FOREIGN PATENT DOCUMENTS

EP 0947852 A1 10/1999
EP 0987561 A2 3/2000
(Continued)

*Primary Examiner* — Timothy A Brainard
(74) *Attorney, Agent, or Firm* — Knobbe, Martens, Olson & Bear, LLP

(57) ABSTRACT

A radar apparatus includes: a transmitting portion including transmitter elements that emits a transmitting signal as a radar wave toward an object; a receiving portion including receiver elements receiving a reflection signal; and an estimation portion. The estimation portion generates a virtual receiving array including virtual receiver elements. The estimation portion divides the virtual receiving array into identical sub-arrays. The estimation portion generates covariance matrix data for each of the sub-arrays. The estimation portion averages the covariance matrix data for each of the sub-arrays to decorrelate a direct reflection signal from the object and multipath reflection signal among the reflection signal and spatially smooths the reflection signal. The estimation portion resolves the direct reflection signal from the object and the multipath reflection signal. The estimation portion determines the direction of the object.

10 Claims, 14 Drawing Sheets

(51) Int. Cl.
  *G01S 13/42*  (2006.01)
  *G01S 13/93*  (2006.01)
  *G01S 7/35*  (2006.01)
  *G01S 7/292*  (2006.01)
  *G01S 3/74*  (2006.01)

(52) U.S. Cl.
  CPC .............. *G01S 13/34* (2013.01); *G01S 13/42* (2013.01); *G01S 13/931* (2013.01); *G01S 3/74* (2013.01); *G01S 2013/9346* (2013.01)

(58) Field of Classification Search
  USPC ........................................................ 342/149
  See application file for complete search history.

(56) References Cited

U.S. PATENT DOCUMENTS

| | | |
|---|---|---|
| 2011/0074621 A1 | 3/2011 | Wintermantel |
| 2011/0080313 A1 | 4/2011 | Wintermantel et al. |
| 2011/0080314 A1 | 4/2011 | Wintermantel |

FOREIGN PATENT DOCUMENTS

| | | |
|---|---|---|
| JP | 2011-058974 | 9/2009 |
| JP | 2011-526373 | 10/2011 |

* cited by examiner

RADAR APPARATUS

CROSS REFERENCE TO RELATED APPLICATIONS

This application is based on European Patent Application No. 14175851.6 filed on Jul. 4, 2014, the disclosure of which is incorporated herein by reference.

TECHNICAL FIELD

The present disclosure relates to a radar apparatus for carrying out two-dimensional direction of arrival (2D DOA) estimation, preferably for use with an automatic emergency braking system of a vehicle (AEBS).

BACKGROUND ART

There is an interest to be able to measure the height of targets observed by forward looking automotive radars. A reason is to reduce the risk of false automatic braking interventions due to elevated objects (e.g. fans in tunnel ceilings, over-head signs, and bridges) and objects at the road surface (e.g. manholes, tramway tracks, and cat's eyes). Hence the radar antenna's capability to estimate horizontal bearings to targets needs to be expanded to a capability of estimating both the horizontal and the vertical bearings. This estimating of both the horizontal and the vertical bearings of an object is known as "two-dimensional direction of arrival (2D DOA) estimation".

EP 0 947 852 A1 provides a radar apparatus that detects a vertical bearing of an object in addition to a horizontal bearing of an object. The radar apparatus has a transmitting antenna comprising a transmitting element and a receiving antenna comprising an array of receiver elements and wherein one or more receiver elements is shifted with respect to the remaining receiver elements by the same vertical displacement. This vertical shift is used to detect a vertical bearing of the target object by using the phase mono-pulse method.

The inventers of the present disclosure have found the following.

There has been a need to provide a radar apparatus, in particular for automotive use, that can detect a vertical bearing of an elevated object in an improved manner, preferably without being influenced by multi-path fading due to the presence of the road surface.

The above problem could be solved if receiver elements at other vertical positions were added, thus adding vertical shifts to the receiving antenna. The signals from the true object and its reflection could be resolved. However this arrangement would result in a larger receiving antenna and also a more complex construction of the radar apparatus as a whole. In addition the vertical extent of each receiving element in the receiving antenna would have to be restricted to prevent the receiving element from overlapping neighboring elements above and below it.

EP 0987561 A2 discloses a radar device wherein two receiver elements are aligned with three transmitter elements which are switched on in sequence. The receiver elements are alternately connected to a signal processing portion in dependence of the switching of the transmitter elements. Therefore the radar device according to EP 0987561 A2 is able to acquire signals equivalent to ones obtained in radars having a single transmission antenna and six reception antennas, and to reduce the number of the reception antennas.

PRIOR ART LITERATURE

Patent Literature

Patent Literature 1: EP 0987561 A2

SUMMARY OF INVENTION

It is an object of the present disclosure to provide a radar apparatus having a reduced size and simple construction, the radar apparatus estimating the vertical bearing of an elevated object in an improved manner.

According to a radar apparatus in the present disclosure, the radar apparatus includes a transmitting portion including a plurality of transmitter elements for emitting a transmitting signal as a radar wave toward an object, a receiving portion including a plurality of receiver elements for receiving a reflection signal that is a reflection of the transmitting signal by the object, and an estimation portion. The estimation portion generates a virtual receiving array including virtual receiver elements whose number corresponds to a total number of receiver elements multiplied by a total number of transmitter elements. The estimation portion divides the virtual receiving array into a plurality of identical sub-arrays. The estimation portion generates covariance matrix data for each of the sub-arrays based on the reflection signal. The estimation portion averages the covariance matrix data for each of the sub-arrays to decorrelate a direct reflection signal from the object and multipath reflection signal among the reflection signal and spatially smooths the reflection signal. The estimation portion resolves the direct reflection signal from the object and the multipath reflection signal based on the result of spatial smoothing of the reflection signal. The estimation portion determines the direction of the object based on the direct reflection signal.

According to the radar apparatus in the present disclosure, reflection signals are able to be subsequently processed to create a virtual receiving array of receiver elements. The number of the virtual receiver elements in the virtual receiving array corresponds to the number of receiver elements multiplied by the number of transmitter elements. The virtual array of receiver elements is divided into identical sub-arrays which facilitates further signal processing of the reflection signals. Following the formation of sub-arrays, covariance matrix data for each of the sub-arrays are generated based on the reflection signal. The covariance matrix data are spatially smoothed by means of averaging to decorrelate the direct reflection signal from the object and multipath reflection signal among the reflection signal. As a result, the direct reflection signal from the object and multipath reflection signal are resolved. Therefore, it is possible to estimate the directions of arrival of a plurality of objects with higher resolution.

According to the radar apparatus, it is possible to provide a radar apparatus having a reduced size and simple construction, the radar apparatus estimating the vertical bearing of an elevated object in an improved manner.

BRIEF DESCRIPTION OF DRAWINGS

The foregoing and other advantages and features of the disclosure will become more apparent from the detailed description of the preferred embodiments of the disclosure given below with reference to the accompanying drawings in which.

DESCRIPTION OF EMBODIMENTS

Figure 1:
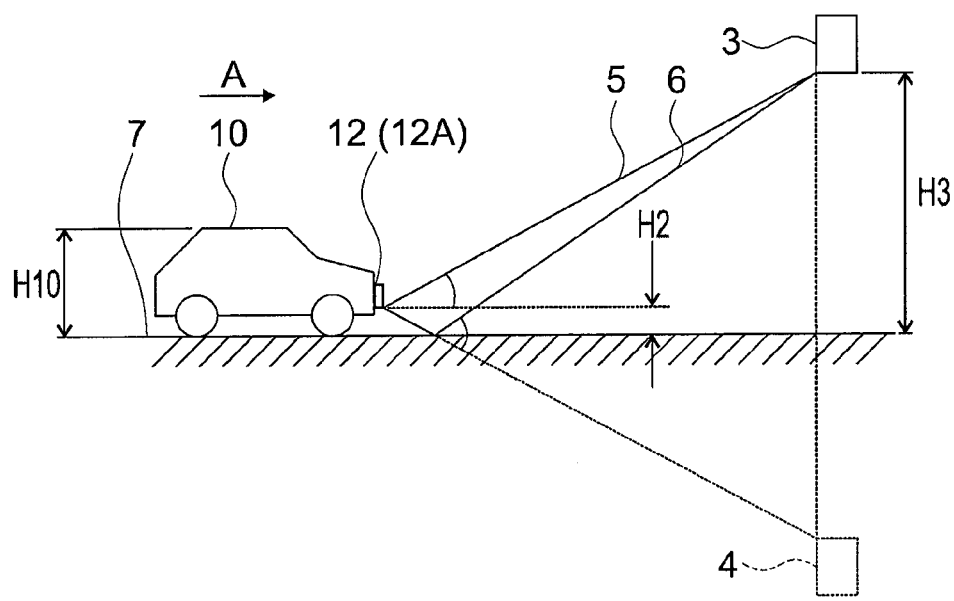
FIG. 1 is a geometry diagram for estimating the vertical bearing of the object using the a radar apparatus, for use on a vehicle to explain related art and the embodiments of the disclosure.

FIG. 1 shows a geometry for estimating the vertical bearing of an object using the automotive radar. Specifically, FIG. 1 shows a vehicle 10 located on a road surface 7. The forward direction of the vehicle 10 is defined by the direction of arrow A. The vehicle 10 is provided with a forward looking radar apparatus 12A having a transmitting antenna and a receiving antenna arranged at a distance H2, which is a mounting height, above the ground. An object 3 which is a target to be detected by the radar apparatus 12A is positioned ahead of the vehicle 10 at a distance H3 above the ground, which is greater than the height H10 of the vehicle 10. The object may be a road sign board, for example.

The function of the radar apparatus 12A according to related art for detecting the vertical bearing of the object 3 is described as follows. Radar waves emitted by the transmitting antenna are subsequently reflected off the object 3 and propagate towards the receiving antenna of the radar apparatus 12A. The vertical bearing of the object 3 is estimated by detecting the angle of incidence of the arriving wave by means of the phase monopulse method.

The radar waves arrive at the receiving antenna of the radar apparatus 12A via at least two different signal paths. The first signal path 5 is a direct path from the object 3 to the receiving antenna. The second signal path 6, which is a multipath signal, is an additional signal path that is reflected from the road surface 7 before arriving at the receiving antenna. The road surface 7 acts as a mirror and so there will be more than one signal from the object 3. If the difference in path lengths is shorter than the radar's range resolution, the received signal will be a superposition of signals that propagated the two signal paths 5 and 6. Attempting to estimate the height of the object 3 by means of the phase mono-pulse method will result in an incorrect height estimate. This is because the result of the phase mono-pulse method cannot distinguish between the object and its "ghost" 4 which is the signal from the object which is reflected off the road surface 7. Only one object within a range distance cell can be detected via the mono-pulse method. Since the superpositioned signals are correlated and unresolved, the vertical bearing of the detected bearing is estimated as a fluctuating value in-between the true target height and the virtual height of the reflected signal. This fluctuating value may cause unnecessary control in such an automatic emergency braking system (AEBS).

(First Embodiment)

In the following, embodiments of the present disclosure will be described in detail.

The embodiments will be described of a radar apparatus to recognize forward objects used for the AEBS. A possibility for applying the disclosure is shown in FIG. 1 which shows a vehicle 10 located on a road surface 7. The forward direction of the vehicle 1 is defined by the direction of arrow A. The vehicle 10 is provided with a forward looking radar apparatus 12. One or more objects which are targets to be detected by the radar apparatus 12 are positioned ahead of the vehicle 10. In FIG. 1 only one of these objects is shown wherein the object 3 is positioned ahead of the vehicle 10 at a distance H3 above the ground which is greater than the height H10 of the vehicle 10. Alternatively distance H3 may be equal to or smaller than height H10 so as to form a potential obstacle in the vehicle's path. The object 3 may be a road sign board, for example. The radar apparatus 12 is capable of emitting radar waves and measuring the waves which return to the radar apparatus 12 after reflecting off the object 3. The radar apparatus 12 receives not only the direct reflection signal (shown as signal path 5) but also the multipath reflection signal which is reflected off the road surface 7 (shown as signal path 6).

Figure 2:
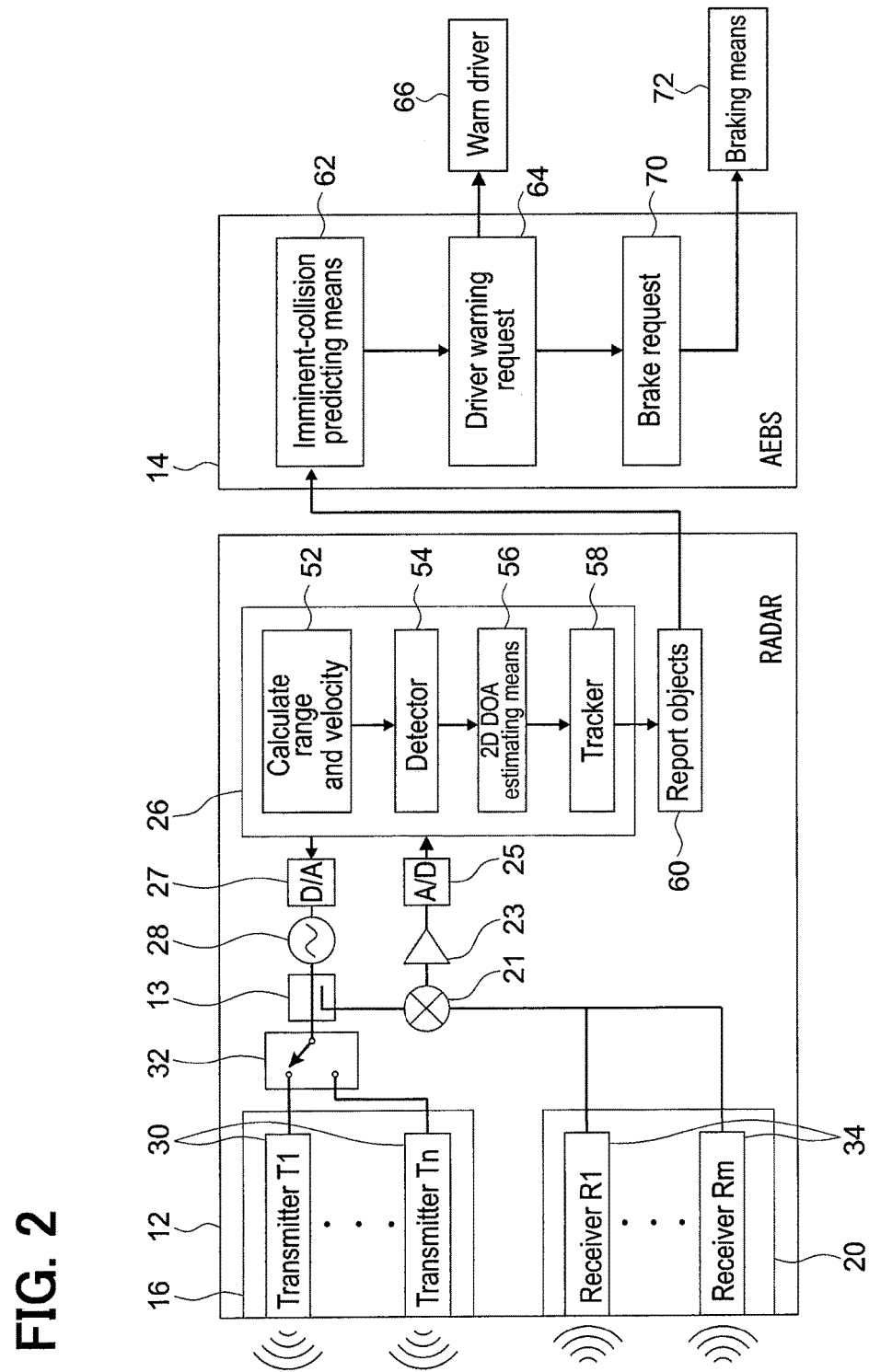
FIG. 2 is a schematic diagram of the radar apparatus according to, preferably all, embodiments of the disclosure and automatic emergency braking system.

FIG. 2 shows a schematic view of the radar apparatus 12 according to, preferably all, embodiments. The radar apparatus 12 is configured as a so-called "millimeter-wave radar" based on an FMCW (Frequency-Modulated Continuous Wave) system. The radar apparatus 12 transmits and receives frequency-modulated electromagnetic waves in a millimeter-wave band as radar waves to and from the object. The radar apparatus 12 generates information regarding the object and transmits the information to the AEBS 14.

A D/A (digital to analog) converter 27 generates triangle-shape modulation signal in response to a modulation command from a signal processing portion 26. A signal generator 28 changes an oscillation frequency thereof in response to the modulation signal generated by the D/A converter 27. A distributor 13 distributes the output signal of the signal generator 28 into a transmission signal sent to a switching portion 32 and a local signal sent to a mixer 21. The switching portion 32 selects one of the transmitter elements 30 such that only one transmitter element 30 is transmitting the radar wave and each transmitter element 30 transmits radar waves for a certain period based on the transmission signal. The transmitting antenna 16 emits the radar waves in response to the transmission signal.

Moreover, the radar apparatus 12 includes a receiving antenna 20, the mixer 21, an amplifier 23 and an A/D converter 25. The receiving antenna 20 receives radar waves which are the reflection of the radar waves emitted from the transmitting antenna 16. The mixer 21 mixes the received signal from the receiving antenna 20 with the local signal thereby generating the beat signal. The amplifier 23 amplifies the beat signal generated by the mixer 21. The A/D converter 25 samples the beat signal amplified by the amplifier 23 and converts the sampled signal into the digital data.

The beat signal is a frequency component of the difference between the received signal and the local signal. It is noted that the frequency component of the beat signal is called the beat frequencies. The frequencies are used for calculation the range and the velocity between the own vehicle and the object by FMCW method.

In the case that a plurality of signal generators 28 is provided, each signal generator 28 feeds respectively differing signals to each transmitter element 30 so that the transmitter elements 30 transmit respectively differing radar waves simultaneously.

The radar apparatus 12, in particular the receiving antenna 20 and preferably also the transmitting antenna 16, is arranged at a distance H2 above the ground, as shown in FIG. 1. The signals received by the receiving antenna 20 subsequently pass to a signal processing portion 26 provided in the radar apparatus 12. The signal processing portion 26 is capable of processing the measured signals received by the receiving antenna 20 and, in combination with information regarding the signals emitted by the transmitting antenna 16, determining the range, velocity and 2D DOA of the object 3. The output of the signal processing portion 26 is subsequently reported via an object reporting portion 60, which is capable of removing ghost object signals from the output of the signal processing portion 26, to the AEBS 14 provided in the vehicle. The AEBS 14 is able to make a decision on whether a collision with the object 3 is imminent and, based on this decision, inform the driver of any imminent collision and/or apply the brakes of the vehicle so that any collision is avoided or mitigated. Therefore the AEBS 14 is able to determine whether a collision is imminent based on the range, velocity and 2D DOA of the object 3 measured by the radar apparatus 12 in combination with the mounting height H2 of the receiving antenna 20 and preferably also the transmitting antenna 16, and the height H10 of the vehicle.

Still referring to FIG. 2, the functional units within the radar apparatus 12 according all embodiments are described in detail in the following.

The transmitting antenna 16 comprises n transmitter elements 30 of the same radiation pattern which are capable of emitting radar waves independently of each other either simultaneously or sequentially. The transmitter elements 30 are named T1 to Tn in FIG. 2. Only transmitter elements T1 and Tn are shown in FIG. 2. The relative positioning of the transmitter elements 30 is described in a later section.

The receiving antenna 20 comprises m receiver elements 34 which are capable of receiving radar waves, wherein m is at least three. The receiver elements 34 are named R1 to Rm. Only receiver elements R1 and Rm are shown in FIG. 2. The relative positioning of the receiver elements 34 is described in a later section.

The signal processing portion 26 is fed with signals which correspond to the radar waves emitted by each transmitter element 30, and with signals which correspond to the radar waves received by the receiver elements 34. The functional units within the signal processing portion 26 according, preferably all, embodiments are described in detail in the following.

The signal processing portion 26 has a range and velocity calculating portion 52 for determining the range and velocity of the object 3. For this function the radar waves transmitted by a single transmitting antenna 30 and detected by the receiver elements 34 are processed by the range and velocity calculating portion 52. In the case that a frequency modulated continuous wave (FMCW) is used, the range and velocity calculating portion 52 calculates the range and velocity of the object 3 based on the beat frequencies using methods known to the skilled person.

The output of the range and velocity calculating portion 52 is processed by a detecting portion 54 which can determine on the basis of the output of the range and velocity calculating portion 52 whether one or more objects is present in front of the vehicle 10.

The output of the detecting portion 54 is fed to a 2D DOA estimating portion 56. The 2D DOA estimating portion 56 may correspond to an example of an estimation portion. Estimation of the vertical and horizontal bearing of the object 3 is performed here according to methods described in a later section. The 2D DOA estimating portion 56 uses the data passed from the output of the detecting portion 54 and combines it with the corresponding 2D DOA values for each object. The processing is performed over a plurality of successive time periods. The 2D DOA estimating portion 56 produces an estimate of the vertical and horizontal bearing of an object or objects for every time period t.

The output of the 2D DOA estimating portion 56, which comprises data regarding the range, velocity, and horizontal and vertical bearings of any object or objects detected by the 2D DOA estimating portion 56 at regular time intervals, is fed to a tracking portion 58. The tracking portion 58 analyses this data over a plurality of time periods and estimates the condition of the object whether or not the object has changed position relative to the vehicle 10 in a successive time period by using a Kalmar Filter for example. The tracking portion 58 is capable of sending object data which is data concerning the range, velocity and 2D DOA of each detected object.

The object data sent by the tracking portion 58 is subsequently sent to the Automatic Emergency Braking System (AEBS) 14 via an object reporting portion 60 which is capable of determining, from within the object data provided by the tracking portion 58, ghost objects which are signals from objects which are reflected off the road surface 7. The determining is performed on the basis of the vertical bearing of each detected object and the mounting height H2 of the receiving antenna 20 and preferably also the transmitting antenna 16, preferably additionally on the basis of whether the detected object is positioned above or below the road surface 7. Optionally the object reporting portion 60 is capable of determining ghost objects additionally on the basis of other object data, such as range and velocity of each detected object, and/or sensor data from other sensors within the vehicle, such as a GPS system or a sensor or sensors capable of detecting road gradient, for example.

The object reporting portion 60 is capable of subsequently removing these ghost objects from the object data before sending it from the radar apparatus 12 to the AEBS 14. The object reporting portion 60 is not limited to sending data to the AEBS 14 only. Optionally the object reporting portion 60 may also be capable of sending data from the radar apparatus 12 to other functional units within the vehicle 10 such an adaptive cruise control system (not shown) that is capable of adjusting the vehicle speed to maintain a safe distance from the vehicles ahead. Thus the object reporting portion 60 is capable of sending data concerning only real objects to other functional units.

Data regarding objects arriving at the AEBS 14 from the object reporting portion 60 passes first to an imminent-collision predicting portion 62. The data comprises the number of objects and the range, velocity and 2D DOA of each object. The imminent-collision predicting portion 62 calculates the vertical and horizontal position of each object 3 relative to the vehicle 10 based on this data, the mounting height H2 of the receiving antenna 20 and preferably also the transmitting antenna 16, and the height H10 of the vehicle. The imminent-collision predicting portion 62 is capable of determining the imminence of a collision with the object on the basis of the horizontal and vertical position of the object 3 relative to the vehicle 10, and the object's range and velocity. When it is determined that a collision with the object 3 is imminent, the imminent-collision predicting portion 62 sends an imminent-collision predicting signal to be received by the driver warning requesting portion 64. The imminent-collision predicting portion 62 is capable to stop sending the imminent-collision predicting signal when it is determined that a collision with the object 3 is no longer imminent.

The driver warning requesting portion 64 is capable of determining whether to activate a driver warning signal based on a signal from the imminent-collision predicting portion 62. When it is determined to activate the warning signal, the driver warning requesting portion 64 sends a driver warning requesting signal to a driver warning portion 66 which can be an acoustic alarm and/or a light on the dashboard, for example. In addition the driver warning requesting portion 64 sends the driver warning request signal to the brake requesting portion 70. The driver warning requesting portion 64 is capable of stopping sending the driver warning requesting signal to both the driver warning portion 66 and the brake requesting portion 70 when the imminent-collision predicting signal is stopped.

The brake requesting portion 70 is capable of determining whether to apply the brakes based on the driver warning request signal from the driver warning requesting portion 64 in combination with whether the driver has not taken evasive action within a predetermined time period since the driver warning portion 66 was activated. Parameters such as the speed of the vehicle may optionally be used here. Evasive action may comprise braking or steering around the object 3, for example. The brake requesting portion 70 is capable of stopping sending of the brake request when the driver warning request signal is stopped.

When it is determined to apply the brakes automatically, the brake requesting portion 70 sends a brake request signal to a braking portion 72 which is capable of automatically applying the brakes of the vehicle 10 without action of the driver.

As a result a collision is avoided or mitigated by warning the driver and/or by automatic emergency braking.

Figure 3:
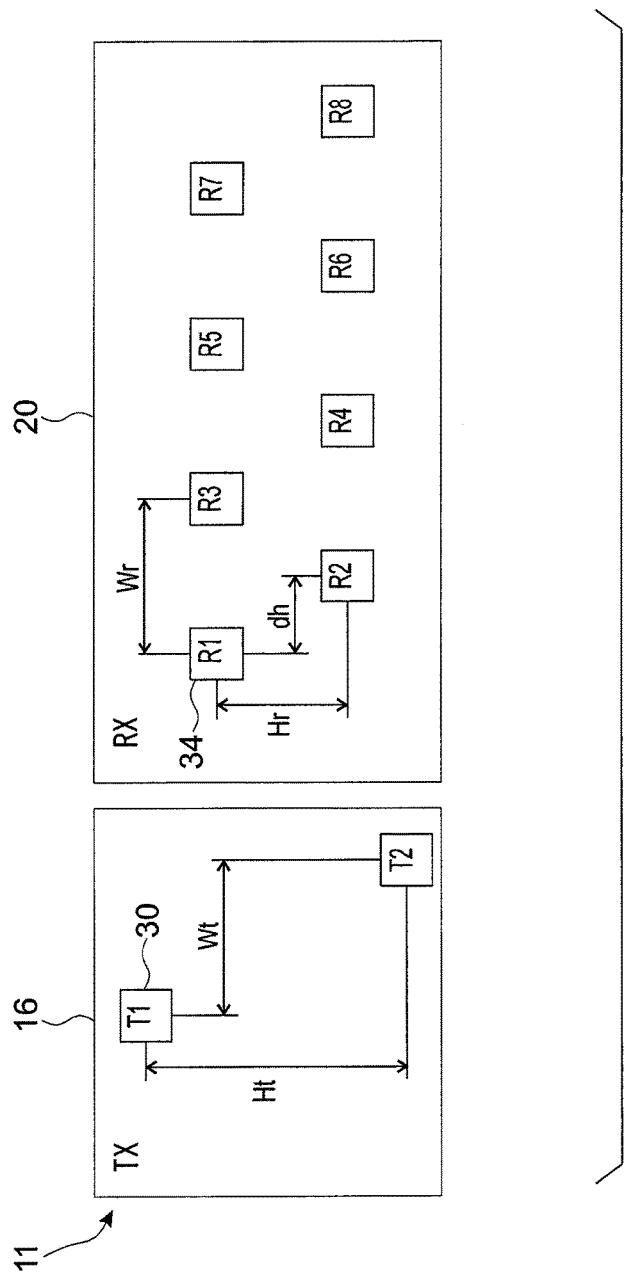
FIG. 3 is a diagram showing an antenna layout according to the first embodiment of the disclosure.

FIG. 3 shows an antenna layout 11 according to the first embodiment of the disclosure, comprising the transmitting antenna 16 and the receiving antenna 20 described above and shown in FIG. 2. The squares marked T1 and T2 each represent the phase centre of a respective transmitter element 30 and the squares marked R1 to R8 each represent the phase centre of a respective receiver element 34. Each transmitter element 30 and receiver element 34 may comprise a plurality of patch antennas connected together. The receiver elements 34 and transmitter elements 30 are disposed in the same plane.

Within the receiving antenna 20, the eight receiver elements R1 to R8 are arranged in a W-shape comprising two rows of receiver elements 34 wherein the rows are relatively shifted by a horizontal shift dh such that the vertical extent of each receiver element 34 does not overlap a receiver element 34 arranged above or below the first. In other words the receiving antenna 20 comprises 8 receiver elements 34 arranged in 8 equispaced columns and 2 rows with 4 receiver elements 34 per row. The rows of receiver elements 34 are spaced apart vertically by a distance Hr.

Within the transmitting antenna 16, the two transmitter elements 30 are displaced relatively to each other in a vertical direction by a distance Ht and in a horizontal direction by a distance Wt. The distance Ht may correspond to a first respective distance, the distance Hr may correspond to a second respective distance, the distance Wt may correspond to a third respective distance, the horizontal shift dh may correspond to a fourth respective distance or a second respective distance in the second direction.

Figure 4A:
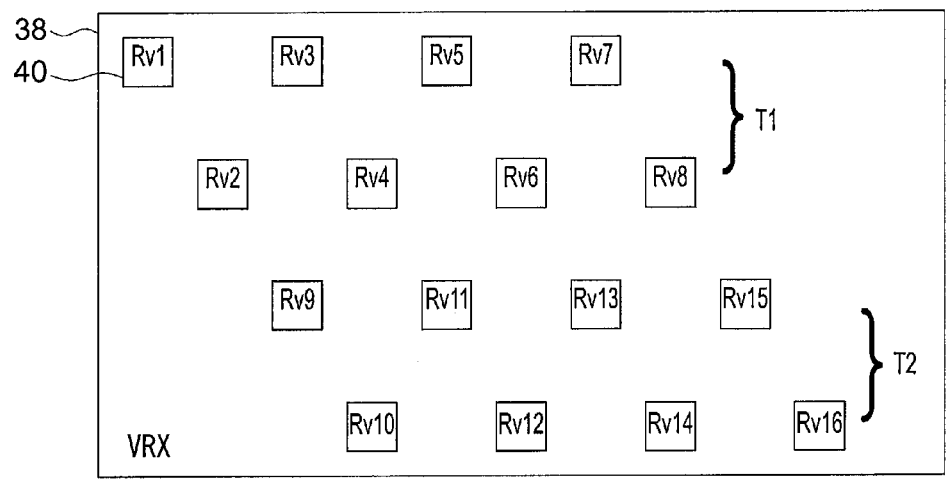
FIG. 4A is a diagram showing a virtual array of receivers according to the first embodiment of the disclosure.

The signal processing portion 26 is able to generate, based on signals transmitted by the transmitter elements 30 and received by the receiver elements 34, a virtual array 38 (also referred to as an a virtual receiving array) of virtual receiver elements 40, which is shown in FIG. 4A.

The signals emitted by a given transmitter element 30 and received by the receiver elements R1 to R8 are identical to those received if the same transmitter element 30 is displaced and the receiver elements 34 are displaced by a corresponding distance but in the opposite direction. This means that the transmitting array 16 with two transmitter elements T1, T2 may be considered as a transmitting array with one transmitter element T1, and the receiving antenna 20 may be considered as a virtual receiving array (also referred to as a virtual array) 38 with sixteen receiver elements Rv1 to Rv16. The positions of the virtual receiver elements Rv9 to Rv16 are determined by translating the positions of the virtual receiver elements Rv1 to Rv8 respectively by a displacement corresponding to the displacement of the transmitter element T2 with respect to the transmitter element T1.

Therefore the virtual array 38 comprises 16 virtual receiver elements Rv1 to Rv16 arranged on four rows, each comprising four receiver elements 34 wherein neighboring rows are relatively shifted horizontally by a distance corresponding to the horizontal shift dh between neighboring rows of receiver elements 34 in the real receiving antenna 20. The rows are spaced vertically by a distance Hr. In the present embodiment, by providing a virtual array with 16 virtual receiver elements 40, the number of effective receiver elements has been doubled. The present disclosure is not limited to a receiving array 20 comprising eight receiver elements 34. For example as a modification of the first embodiment it is possible to increase the number of receiver elements 34 in the receiving array 20 by adding further receiver elements 34 to each row maintaining the same spacing dh as the present receiver elements 34. The arrangement of transmitter elements 30 does not need to be modified in this case. The embodiments described in later sections comprise further possible transmitter element 30 and receiver element 34 arrangements.

The distance Wt between the two transmitter elements 30 in the horizontal direction preferably corresponds to twice the horizontal shift dh between neighboring rows of receiver elements 34. The distance Wr between two neighboring receiver elements R1 and R3 in the same row preferably corresponds to the distance Wt. Furthermore the vertical distance Ht between the two transmitter elements 30 corresponds to twice the vertical distance Hr between neighboring rows of receiver elements 34.

The 2D DOA estimating portion 56 is capable of estimating the horizontal and vertical bearings of objects using the output of each receiver element 40 in the virtual array. When the signals from each virtual antenna (also referred to as a virtual receiver element) 40 are recorded, then the signals from the virtual receiver elements 40 can be gathered in a column vector X=[x1, x2, . . . x16]T where xi is the signal received by the ith (1, 2, . . . 16) virtual receiver element 40. The direction-of-arrival estimation algorithms that may be used here are so-called eigenvalue techniques based on the eigenvalue decomposition of the sample covariance matrix of the vector of received signals. Hereinafter the term "sample covariance" is abbreviated to "covariance". In other words DOA is estimated from the covariance matrix. In the case of the present embodiment, the covariance matrix of the virtual antenna (also referred to as a virtual array) 38 in FIG. 4A is a (16×16) matrix.

Eigenvalue decomposition algorithms known from related art may be used here, such as ESPRIT and Capon. The preferred algorithm is the MUSIC (Multiple Signal Classification) algorithm which is described, for example, by R. O. Schmidt in "Multiple Emitter Location and Signal Parameter Estimation," (IEEE Trans., vol. AP-34, No. 3, pp. 276-280, March 1986). An advantage of the MUSIC method is increased resolution of DOA estimation especially in the presence of noise.

The performance of the radar apparatus 12 that estimates 2D DOA by means of an eigenstructure technique can be improved especially in the case of decorrelating coherent or highly correlated signals. Examples of such signals could be two other vehicles driving side-by-side, or a direct signal from a road sign board and the signal from its mirror image reflected off the road, for example. In cases such as these it is advantageous for the radar apparatus 12 to be capable of decorrelating signals. Two methods for improving decorrelation are given in the following, wherein either one or both of the improvement methods are used in addition to the eigenvalue techniques mentioned above.

First a spatial smoothing method for improved resolving performance is described in the following.

Figure 4B:
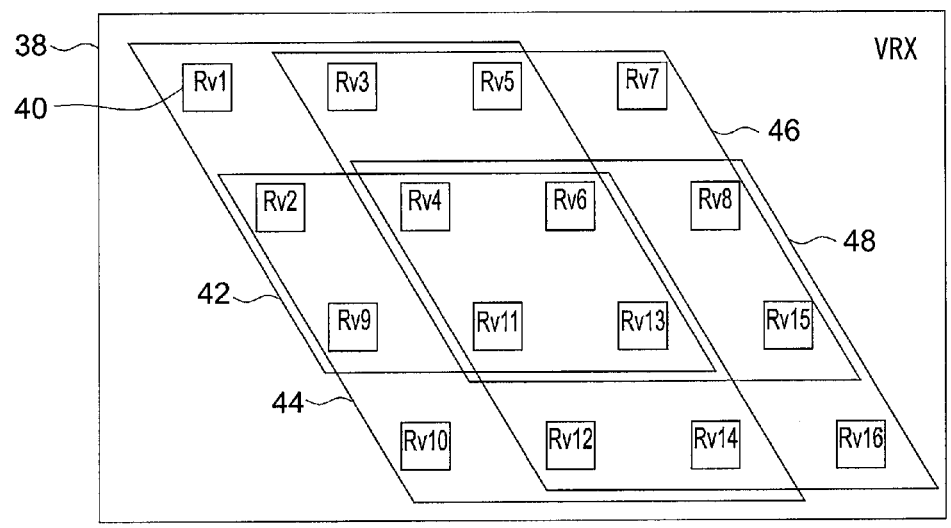
FIG. 4B is a diagram showing the virtual array of receivers according to the first embodiment of the disclosure, divided into sub-arrays.

In addition to creating the virtual array 38, and as a preprocessing step before performing eigenvalue decomposition, the 2D DOA estimating portion 56 is capable of dividing all the virtual receiver elements 40 in the virtual receiving array 38 into overlapping identical sub-arrays each comprising a portion of the total number of virtual receiver elements 40 in the virtual array 38 and a covariance matrix for each sub-array is determined. The sub-arrays 42, 44, 46 and 48 are shown in FIG. 4B for the case of the virtual array 38 according to the present embodiment wherein sub-array 42 comprises virtual receiver elements Rv1, Rv3, Rv5, Rv2, Rv4, Rv6, Rv9, Rv11 and Rv13; sub-array 44 comprises Rv2, Rv4, Rv6, Rv9, Rv11, Rv13, Rv10, Rv12 and Rv14; sub-array 46 comprises Rv3, Rv5, Rv7, Rv4, Rv6, Rv8, Rv11, Rv13 and Rv15; and sub-array 48 comprises Rv4, Rv6, Rv8, Rv11, Rv13, Rv15, Rv12, Rv14 and Rv16. Therefore each sub-array comprises nine virtual receiver elements 40 and so the covariance matrix for each sub-array is a (9×9) matrix.

The 2D DOA estimating portion 56 is capable of subsequently calculating an average covariance matrix which is a mean average of the covariance matrices of the sub-arrays and has size (9×9). The receiver elements 34 of the receiving antenna 20, specifically their phase centers, are arranged such that the virtual receiver elements 40 of the virtual array 38 can be divided into overlapping sub-arrays of identical geometry.

Therefore in the case of highly correlated signals such as the road sign board and its reflection, the effect of the averaging of the sub-array covariance matrices is to decorrelate the two signals, since the sub-arrays receive signals from the objects from slightly different positions, and so the number of snapshots is increased by a factor of four. Hence the phase difference between the direct signal and the multipath signal will vary between the sub-arrays and this will lead to a decorrelation.

Next a forward-backward averaging method is described for further decorrelation of coherent or highly correlated sources. The forward-backward averaging method exploits the symmetrical structure of the virtual array 38 and the phase centers of its sub-arrays 42, 44, 46 and 48 shown in FIG. 4B. For every sub-array with phase center at a position relative to the center of the virtual array 38 represented by a vector p, there is also a phase center a position represented by vector −p. Forward-backward averaging is then applied to the covariance matrix so that it is arranged into a Toeplitz structure. Therefore signals are decorrelated further.

Any of the eigenvalue techniques mentioned above, preferably the MUSIC algorithm, are then performed on the modified covariance matrix that results from either or both of the above improvement methods. Therefore signals such as a direct signal from an object and the ghost signal from its reflection in the road surface 7 can be decorrelated and resolved.

It is to be noted that the problem of multipath reflections becomes more severe as the mounting height of the radar apparatus is increased. A reason is that more energy needs to be directed downward by the transmitting antenna 16 in order to observe low objects. Another reason is that the angle difference between the direction to the true object 3 and the direction to the reflected object 4 becomes smaller. Therefore when detecting low objects in front of the vehicle 10 it should be borne in mind that despite the methods applied in the present disclosure there is still some possibility of false detection of highly correlated signals. The method can be further improved by considering mounting height, for example as mounting height increases it is advantageous to increase the number of receiver element rows in the virtual array.

As described above, with the radar apparatus according to the present embodiment, the following advantageous effects are obtained.

Due to the arrangement of transmitter elements 30 in the transmitting antenna 16 and the arrangement of receiver elements 34 in the receiving array 20, it is possible for the signal processing portion 26 to process the signals from the transmitter elements 30 and receiver elements 34 such that a virtual array 38 of virtual receiver elements 40 is generated. The number of virtual receiver elements 40 is twice the number of real receivers 34. Therefore it is possible to increase the effective number of receiver elements with a reduced number of real receiver elements 34. This means that the size and complexity of the radar apparatus 12 can be kept low.

In addition the virtual array 38 comprises an arrangement of virtual receiver elements 40 that is impossible to construct from receiver elements 34, especially when considering the limitations of vertical dimensions of an antenna layout for a car. Referring to the virtual array 38 shown in FIG. 4A, this is because virtual receiver elements Rv3 to Rv14 are arranged in a column above or below another virtual receiver element 40. For example virtual receiver element Rv9 is arranged in a column with and below virtual receiver element Rv3. If these virtual receiver elements 40 were part of a real array of receiver elements, the vertical extent of these receiver elements would have to be reduced to prevent overlapping. On the other hand overlapping by virtual receiver elements is possible in the virtual array 38. No overlapping with neighboring receiver elements occurs between receiver elements 34 in the receiving antenna 20. Therefore the vertical extent of each receiver element in both the real receiving antenna 20 and the virtual array 38 can be increased.

The virtual array 38 comprises more than two rows of virtual receiver elements 40 with more than two virtual receiver elements 40 per row. A covariance matrix of signals from the virtual array 38 can be constructed and 2D DOA of objects can be estimated using eigenvalue techniques. The horizontal and vertical bearings of more than one object can be simultaneously determined. Here the present embodiment provides advantages over radar apparatuses according to related art that use the phase monopulse method to detect the vertical bearing of an object. In this case the vertical bearing of only one object can be determined at any one time. In the present embodiment on the other hand, respective signals from multiple objects can be resolved and objects above the road are not detected as being straight ahead. It is also possible to reduce the size of the receiving antenna 20 compared to a configuration in which a real receiving antenna comprises the same number of receiver elements as the virtual array 38 of the present embodiment.

The arrangement of virtual receiver elements 40 in the virtual array 38 has a symmetrical geometry and can be divided into identical and overlapping sub-arrays. This allows the spatial smoothing techniques described above to be used to decorrelate correlated signals such as a direct signal from an object and the signal from its reflection in the road surface 7. After decorrelation the two signals can be resolved. The radar apparatus 12 is capable of providing the AEBS 14 with accurate information regarding the vertical bearing of objects. The object reporting portion 60 is capable of determining that the reflected signals are not sources of real objects, and false intervention based on these signals, such as sending a driver warning request or sending a brake request, is avoided.

Next, further embodiments of the disclosure will be described. The differences between the embodiments lie in the arrangement of the transmitter element 30 and the receiver element 34. The function of the transmitter element and the receiver element 34 are applicable to all embodiments.

(Second Embodiment)

Next, a second embodiment of the disclosure will be described. Hereinafter, differences from the first embodiment will be described.

Figure 5:
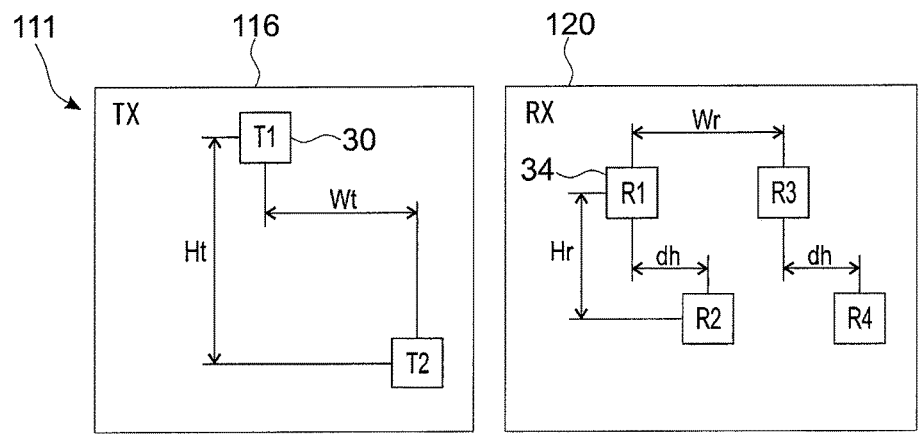
FIG. 5 is a diagram showing an antenna layout according to a second embodiment of the disclosure.

FIG. 5 shows an antenna layout 111 according to the second embodiment of the disclosure, comprising a transmitting antenna 116 and receiving antenna 120.

The receiving antenna 120 comprises four receiver elements R1 to R4 relatively arranged in the same positions as receiver elements R1 to R4 of the first embodiment of FIG. 3.

The transmitting antenna 116 comprises two transmitter elements T1 and T2 arranged in the same positions as the transmitter elements T1 and T2 of the first embodiment of FIG. 3. In other words the two transmitter elements T1, T2 are displaced relatively to each other in a vertical direction by a distance Ht which corresponds to twice Hr, and in a horizontal direction by a distance Wt which corresponds to twice dh. The distance Wr preferably corresponds to the distance Wt.

Figure 6:
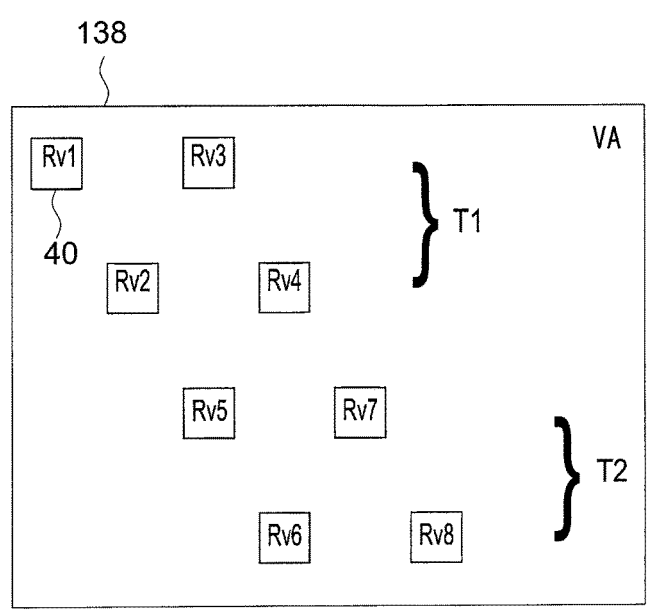
FIG. 6 is a diagram showing a virtual array of receivers according to the second embodiment of the disclosure.

FIG. 6 shows the virtual array 138 of virtual receiver elements 40 according to the second embodiment of the disclosure. The virtual array 138 comprises eight virtual receiver elements Rv1 to Rv8 arranged on four rows, each row comprising two virtual receiver elements, wherein neighboring rows are relatively shifted horizontally by a distance corresponding to the horizontal shift dh between neighboring rows of receiver elements 34.

The receiving antenna 120 according to the second embodiment of the disclosure comprises four receiver elements R1 to R4, which is four fewer elements than for the receiving antenna 20 according to the first embodiment. In this way a simpler receiving antenna construction is possible.

The virtual array 138 of virtual receiver elements Rv1 to Rv8 can be divided into identical sub-arrays wherein for example the first sub-array comprises virtual receiver elements Rv1 to Rv4, Rv5 and Rv7 and the second sub-array comprises virtual receiver elements Rv2 to Rv7, Rv6 and Rv8. In this way 2D DOA via spatial smoothing is possible.

(Third Embodiment)

Figure 7:
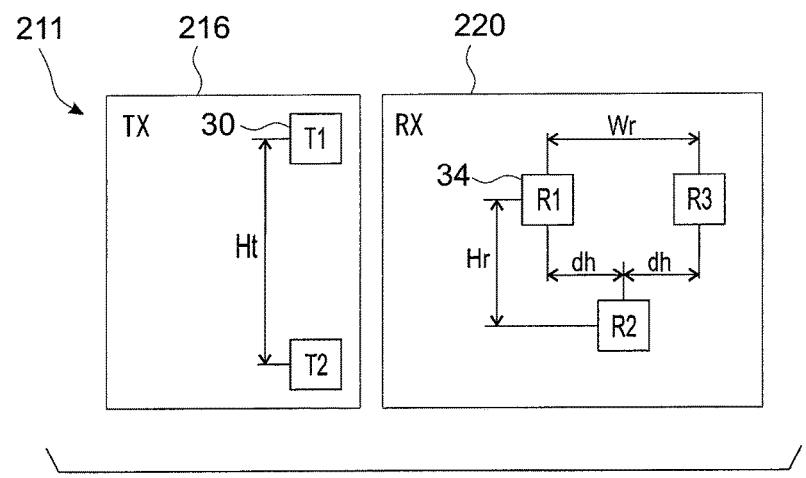
FIG. 7 is a diagram showing an antenna layout according to a third embodiment of the disclosure.

Next, a third embodiment of the disclosure will be described. Hereinafter, differences from the second embodiment will be described. The function of the transmitter element 30 and the receiver element 34 are applicable to all embodiments. FIG. 7 shows an antenna layout 211 according to the third embodiment of the disclosure, comprising a transmitting antenna 216 and a receiving antenna 220.

The receiving antenna 220 comprises three receiver elements R1 to R3 relatively arranged in the same positions as receiver elements R1 to R3 of the receiving antenna 20 of the first embodiment of FIG. 3. In other words the receiving antenna 220 comprises three receiver elements 34 arranged in three equispaced columns and two rows wherein the spacing between columns in the horizontal direction is dh. The rows of receiver elements 34 are spaced apart vertically by a distance Hr. The rows comprise two and one receiver elements 34 respectively.

The transmitting antenna 216 comprises two transmitter elements T1 and T2 arranged in a column. In other words the two transmitter elements T1, T2 are displaced relatively to each other in a vertical direction by a distance Ht which corresponds to twice Hr.

Figure 8:
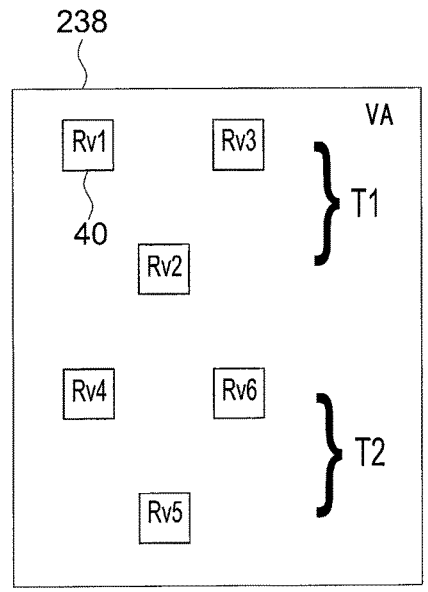
FIG. 8 is a diagram showing a virtual array of receivers according to the third embodiment of the disclosure.

FIG. 8 shows the virtual array 238 of virtual receiver elements 40 according to the third embodiment of the disclosure. The virtual array 238 comprises six receivers Rv1 to Rv6 arranged on four rows, each row comprising alternately two or one virtual receiver elements, Because the distance Ht in the vertical direction between transmitter elements 30 corresponds to twice the distance Hr in the horizontal direction between receiver elements 34, neighboring rows of virtual receiver elements 40 are equispaced.

The advantages of the third embodiment of the disclosure are now described. The antenna layout 211 according to the third embodiment of the disclosure requires fewer receiver elements 34 than for the first embodiment of the disclosure. In addition the horizontal spacing of the transmitter elements 30 is zero. Therefore a simple construction of the radar apparatus 12 is ensured and the size of the transmitting antenna 216 in the horizontal direction is reduced.

(Fourth Embodiment)

Figure 9:
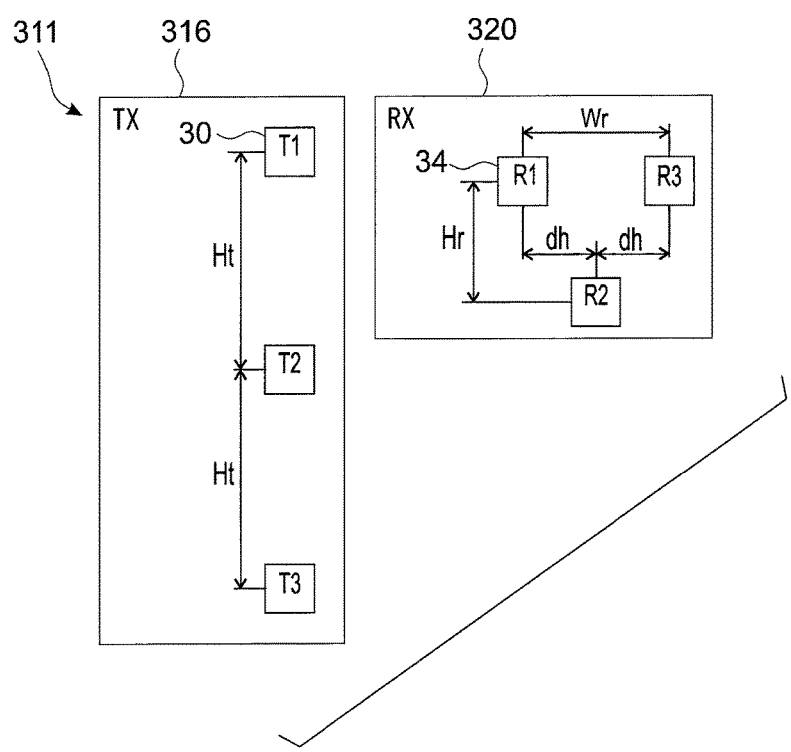
FIG. 9 is a diagram showing an antenna layout according to a fourth embodiment of the disclosure.

Next, a fourth embodiment of the disclosure will be described. Hereinafter, differences from the third embodiment will be described. FIG. 9 shows an antenna layout 311 according to the fourth embodiment of the disclosure, comprising a transmitting antenna 316 and a receiving antenna 320.

The receiving antenna 320 comprises three receiver elements R1 to R3 relatively arranged in the same positions as receiver elements R1 to R3 of the receiving antenna 220 of the third embodiment of FIG. 9.

The transmitting antenna 316 comprises a third transmitter element T3 vertically below transmitter element T2. In other words the three transmitter elements T1 to T3 are displaced relatively to each other in a vertical direction by a distance Ht which corresponds to twice the distance Hr in a vertical direction between neighboring rows of receivers 34.

Figure 10:
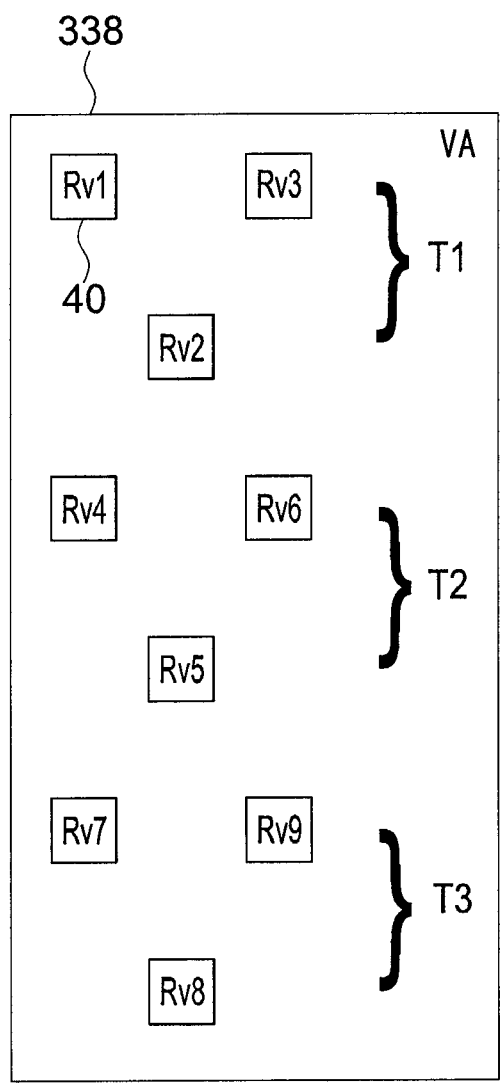
FIG. 10 is a diagram showing a virtual array of receivers according to the fourth embodiment of the disclosure.

FIG. 10 shows the virtual array 338 of virtual receiver elements 40 according to the fourth embodiment of the disclosure. The virtual array 338 comprises 9 receivers Rv1 to Rv9 arranged on six rows, each row comprising alternately two or one receiver elements. Because the distance Ht in the vertical direction between transmitter elements 30 corresponds to twice the distance Hr in the horizontal direction between receiver elements 34, neighboring rows of virtual receiver elements 40 are equispaced.

The advantages of the fourth embodiment of the disclosure are now described. In comparison to the virtual array 238 according to the third embodiment, the virtual array 338 according to the fourth embodiment is able to be divided into identical sub-arrays wherein one sub-array comprises virtual receiver elements Rv1, Rv2, Rv3, Rv4, Rv5 and Rv6 and another sub-array comprises virtual receiver elements Rv4, Rv5, Rv6, Rv7, Rv8 and Rv9. Therefore the resolution between close objects may be improved via use of spatial smoothing, and the subspace-method according to the first embodiment can be applied to the present embodiment.

(Fifth Embodiment)

Next, a fifth embodiment of the disclosure will be described. Hereinafter, differences from the first embodiment will be described. In the first embodiment the number of rows of receiver elements 34 is limited to two. If an additional row of receiver elements 34 is added to the receiving antenna 20 of the first embodiment (FIG. 3), it is possible to increase the number of virtual receiver elements 40 in the virtual array 38.

Figure 11:
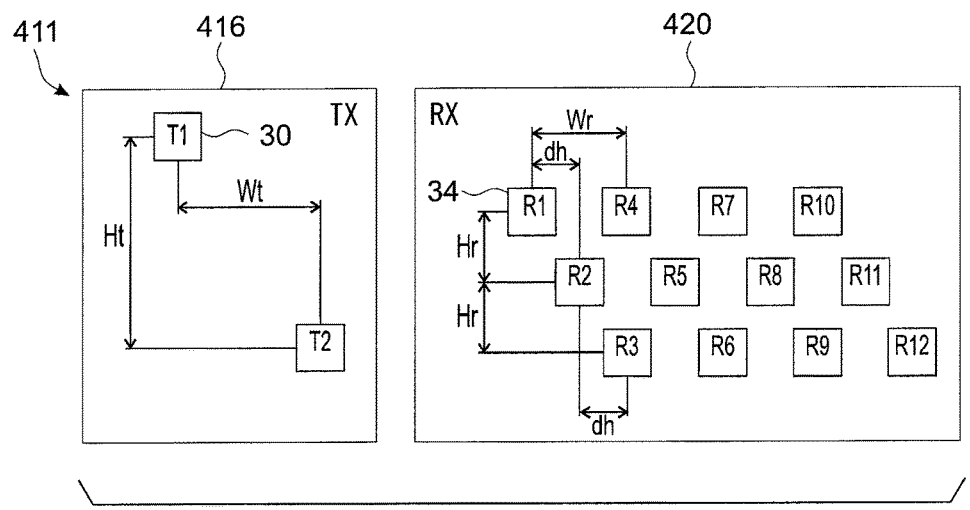
FIG. 11 is a diagram showing an antenna layout according to a fifth embodiment of the disclosure.

FIG. 11 shows an antenna layout 411 according to the fifth embodiment of the disclosure, comprising a transmitting antenna 416 and a receiving antenna 420.

The receiving antenna 420 comprises twelve receiver elements R1 to R12 arranged in a two-tiered W-shape comprising three rows of receiver elements 34 wherein neighboring rows are relatively horizontally shifted by a distance dh such that the vertical extent of each receiver element 34 does not overlap a receiver element 34 in an neighboring row. In other words the receiving antenna 420 comprises 12 receiver elements 34 arranged in nine columns and three rows with four receiver elements 34 per row. The rows of receiver elements 34 are spaced apart vertically by a distance Hr.

The transmitting antenna 416 comprises two transmitter elements T1, T2 which are displaced relatively in a vertical direction by a distance Ht and in a horizontal direction by a distance Wt.

The distance between the two transmitter elements 30 in the horizontal direction Wt corresponds to three times the horizontal shift dh of receiver element rows. Furthermore the distance between the two transmitter elements 30 in the vertical direction Ht corresponds to three times the vertical distance Hr between neighboring rows of receiver elements 34.

Figure 12:
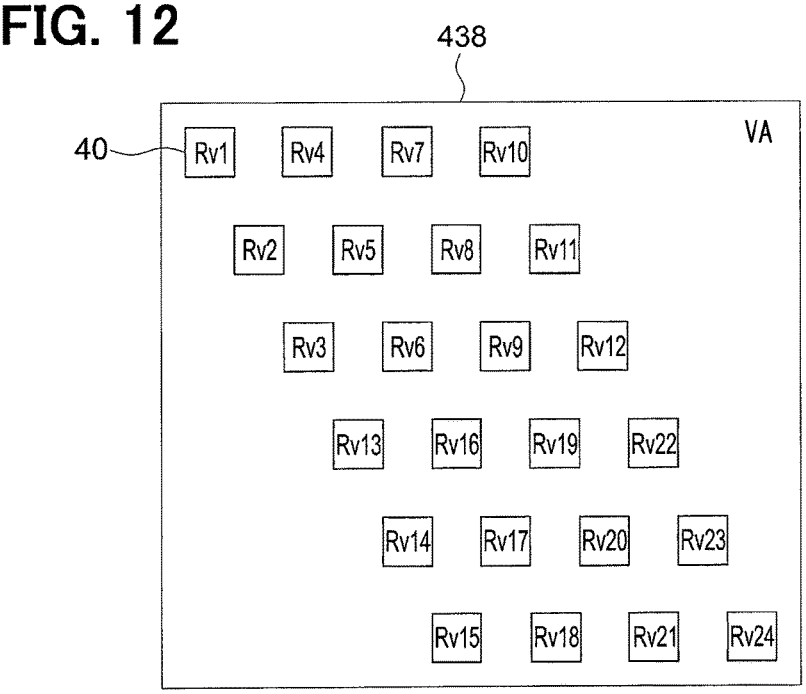
FIG. 12 is a diagram showing a virtual array of receivers according to the fifth embodiment of the disclosure.

FIG. 12 shows a resulting virtual array 438 of virtual receiver elements 40. The virtual array comprises 24 virtual receiver elements Rv1 to Rv24 arranged on 6 rows wherein neighboring rows are relatively shifted horizontally by a distance corresponding to the horizontal shift dh.

The advantages of the fifth embodiment of the disclosure are now described. The receiving antenna 420 comprises three rows of receiver elements 34 wherein neighboring rows are relatively horizontally shifted by a distance dh such that the vertical extent of each receiver element 34 does not overlap a receiver element 34 in a neighboring row. Compared to a configuration with no horizontal shift, the vertical extent of each receiver element 34 is not as limited and the vertical extent can be increased. The number of rows of receiver elements 34 is three. This results in a greater number of virtual receiver elements 40 in comparison to the previous embodiments. Therefore vertical resolution of the radar apparatus is further improved.

(Sixth Embodiment)

Figure 13:
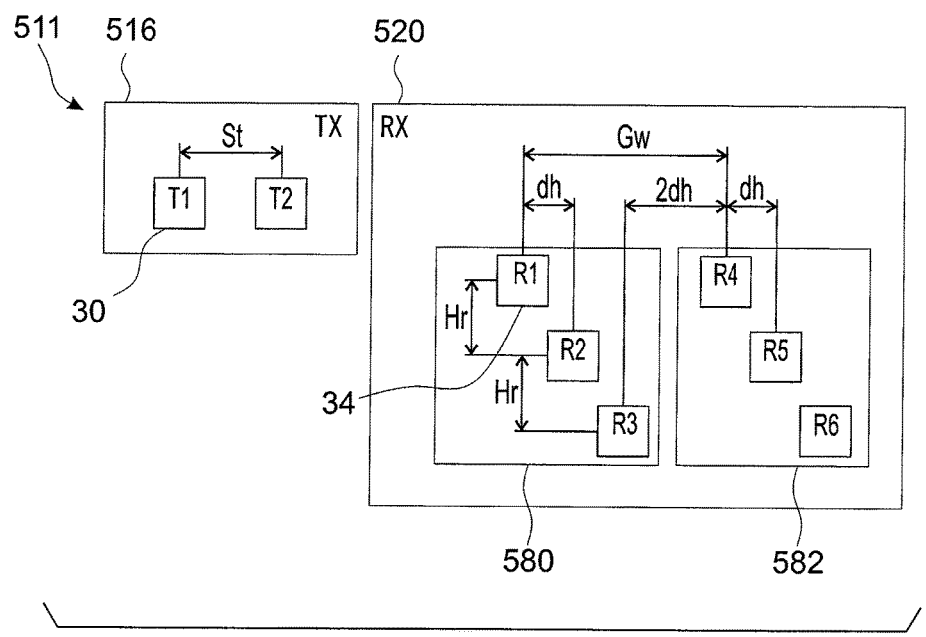
FIG. 13 is a diagram showing an antenna layout according to a sixth embodiment of the disclosure.

Next, a sixth embodiment of the disclosure will be described. Hereinafter, differences from the first embodiment will be described. FIG. 13 shows an antenna layout 511 according to the sixth embodiment of the disclosure, comprising a transmitting antenna 516 and a receiving antenna 520.

The receiving antenna 520 comprises six receiver elements 34 arranged in two groups 580, 582 which are spaced by a distance Gw in the horizontal direction. Each group comprises three receiver elements 34. Within each group, the three receiver elements 34 are arranged in three rows with one receiver element 34 per row. The rows are relatively shifted by a horizontal shift dh such that the vertical extent of each receiver element 34 does not overlap a receiver element 34 arranged above or below the first. In other words the receiving antenna 520 comprises six receiver elements 34 arranged in two groups of three rows with one receiver element 34 per row per group. The rows of receiver elements 34 are spaced apart vertically by a distance Hr.

Groups of receivers are horizontally aligned and the distance (Gw) between groups in the horizontal direction corresponds to four times the column spacing of receivers (dh).

The transmitting antenna 516 comprises two transmitter elements T1, T2 which are horizontally aligned and relatively displaced in a horizontal direction by a distance St. The horizontal distance between neighboring transmitters in the same row St corresponds to Gw/2 which is 2dh. The distance St may correspond to a fifth respective distance or a first respective distance in the second direction, and the distance Gw may correspond to a sixth respective distance or a third respective distance in the second direction.

Figure 14:
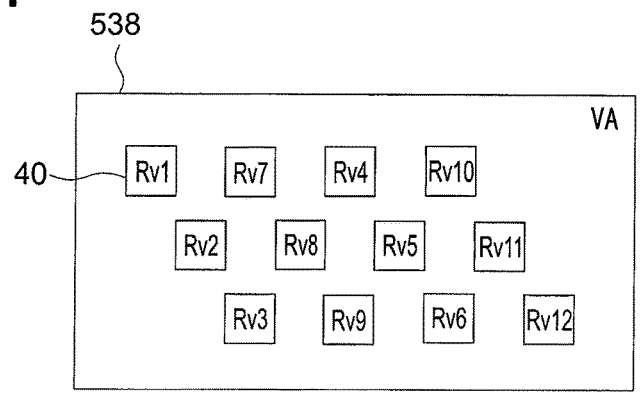
FIG. 14 is a diagram showing a virtual array of receivers according to the sixth embodiment of the disclosure.

FIG. 14 shows a resulting virtual array 538 of virtual receiver elements 40 according to the sixth embodiment of the disclosure. The virtual array 538 comprises twelve virtual receiver elements Rv1 to Rv12 arranged on 3 rows each comprising four virtual receiver elements 40 wherein neighboring rows are relatively shifted horizontally by a distance corresponding to the horizontal shift dh between neighboring rows of virtual receiver elements 40 in the real receiving antenna 520. In the present embodiment, by providing a virtual array with 12 receiver elements, the number of effective receiver elements has been doubled compare to the receiver elements 34 of receiving antenna 520.

The virtual array according to the sixth embodiment of the disclosure differs from the previous embodiments in that the layout of virtual receiver elements 40 is not the physical receiver element layout repeated side-by-side. Rather the columns of virtual receiver elements 40 in the virtual array 538 are arranged in a shape where columns from the two receivers are interleaved.

The advantages of the sixth embodiment are as follows. The receiving antenna 520 comprises receiver elements 34 arranged in three rows wherein each receiver element 34 has unique horizontal displacement. Therefore each receiver element 34 does not overlap with another receiver element 34 above or below it, and so a third row of receiver elements 34 is provided without limiting the vertical extent of each receiver element 34. In addition, in comparison the first embodiment, the average separation between receiver elements 34 is larger and so the isolation of receiver elements 34 is increased. Furthermore a large vertical dimension of the receiving antenna 520 is possible.

(Seventh Embodiment)

Figure 15:
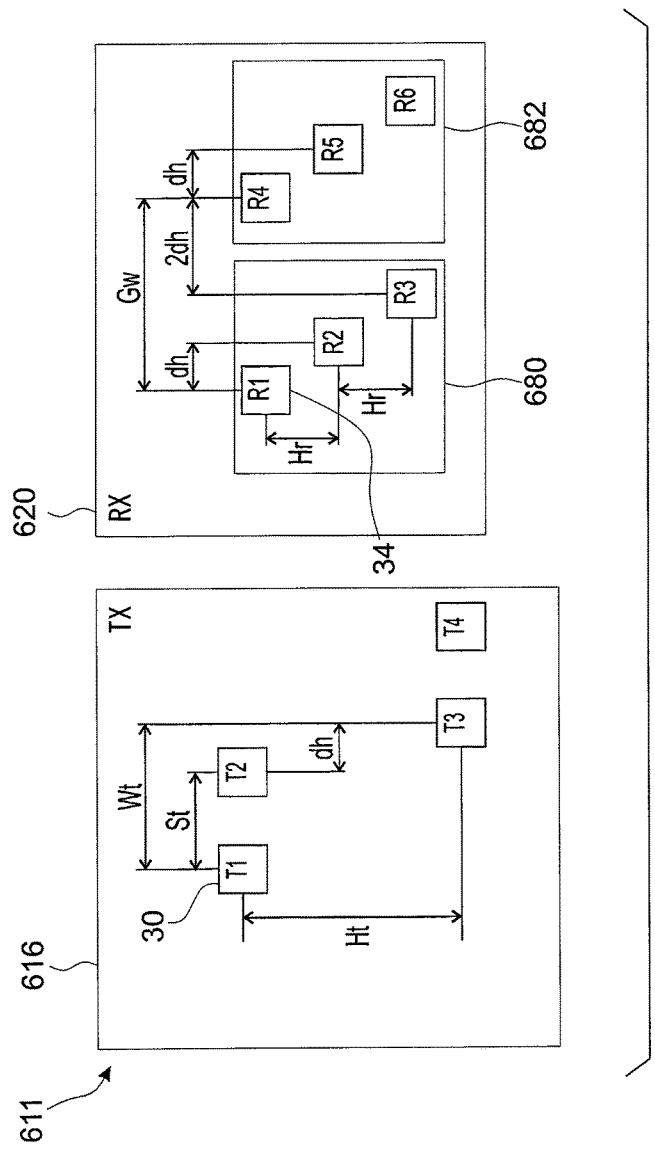
FIG. 15 is a diagram showing an antenna layout according to a seventh embodiment of the disclosure.

Next, a seventh embodiment of the disclosure will be described. Hereinafter, differences from the sixth embodiment will be described. FIG. 15 shows an antenna layout 611 according to the sixth embodiment of the disclosure, comprising a transmitting antenna 616 and a receiving antenna 620.

The receiving antenna 620 has the same receiver element layout as the receiving antenna 520 of the sixth embodiment.

The transmitting antenna 616 comprises the transmitter elements T1 and T2 in the same positions as in the sixth embodiment in addition to a second row of transmitter elements T3, T4 displaced from the position of the transmitter element T1 in a horizontal direction by a distance Wt and in the vertical direction by a distance Ht. The distance between transmitter elements T3 and T4 in the horizontal direction is the same as the distance between T1 and T2 in the horizontal direction.

The distance Ht in the vertical direction between neighboring rows of transmitter elements 30 corresponds to three times the distance Hr in the vertical direction between neighboring rows of receiver elements 34. In addition the horizontal shift Wt between neighboring rows of transmitter elements 30 corresponds to three times the columns spacing (or horizontal shift) dh of receiver elements 34.

Figure 16:
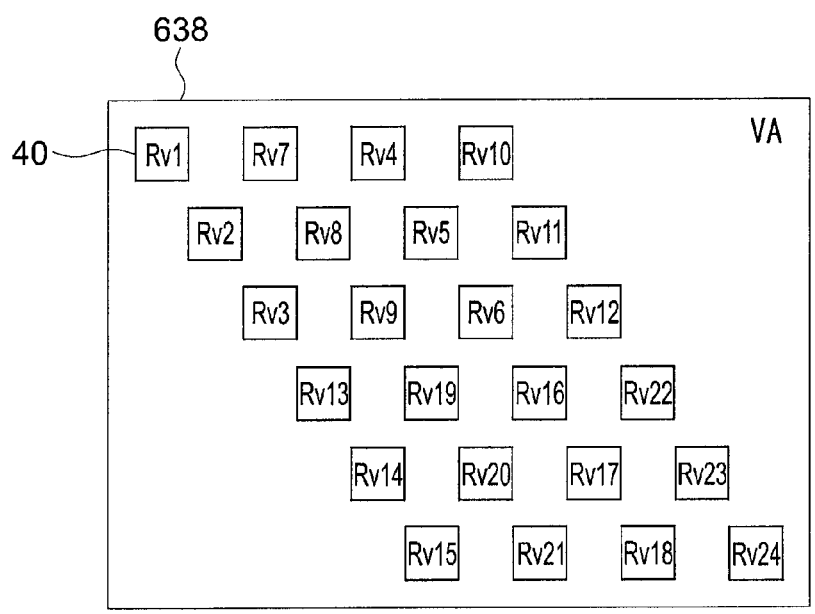
FIG. 16 is a diagram showing a virtual array of receivers according to the seventh embodiment of the disclosure.
Figure 17:
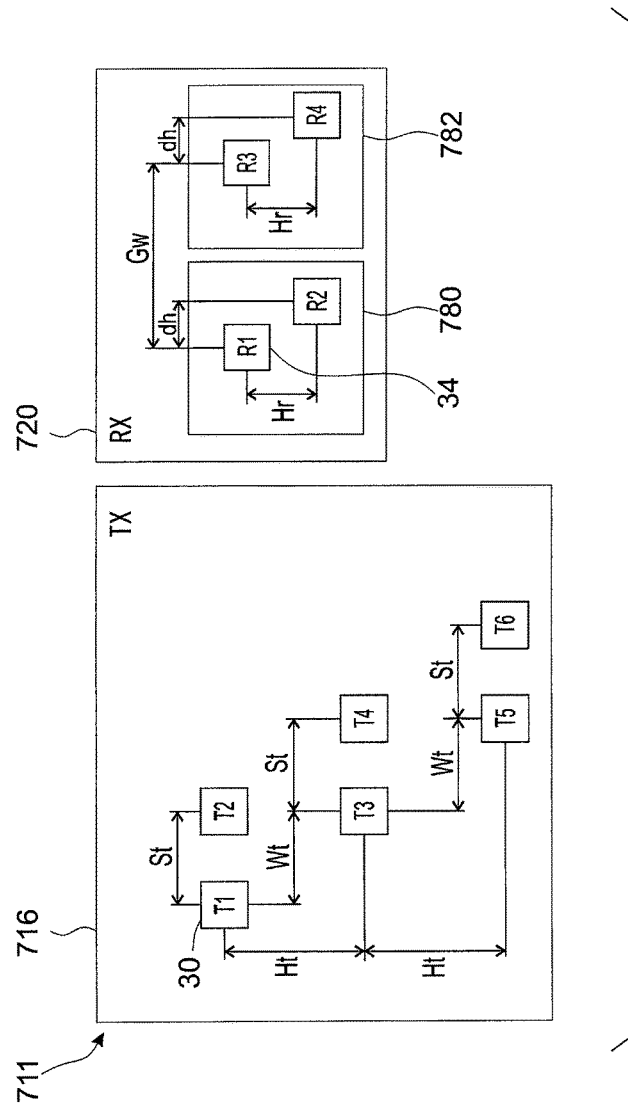
FIG. 17 is a diagram showing an antenna layout according to an eighth embodiment of the disclosure.

FIG. 16 shows the virtual array 638 of virtual receiver elements 40 according to the seventh embodiment of the disclosure. In comparison to the virtual array of the sixth embodiment, the virtual array according to the seventh embodiment comprises 12 additional virtual receiver elements Rv13 to Rv24 arranged on 3 additional rows below the rows that comprise virtual receiver elements Rv1 to Rv12 wherein each row comprises four virtual receiver elements 40.

The advantages of the seventh embodiment are as follows.

The receiving antenna 620 comprises receiver elements 34 arranged in three rows wherein each receiver element 34 has unique horizontal displacement. Therefore each receiver element 34 does not overlap with another receiver element 34 above or below it, and a so third row of receiver elements 34 is provided without limiting the vertical extent of each receiver element 34.

By providing a virtual array with twenty-four virtual receiver elements 40, the number of effective receiver elements has been quadrupled compared to the receiver elements 34 of the receiving antenna 620. Therefore a higher resolution radar apparatus is provided with a reduced number of receiver elements 34 and the size of the radar apparatus is kept small.

(Eighth Embodiment)

Next, an eighth embodiment of the disclosure will be described. Hereinafter, differences from the seventh embodiment will be described. FIG. 19 shows an antenna layout 711 according to the seventh embodiment of the disclosure comprising a transmitting antenna 716 and a receiving antenna 720.

The transmitting antenna 716 comprises six transmitter elements T1 to T6 arranged in three rows with two transmitter elements 30 per row. The arrangement is a development of the sixth and seventh embodiments in that transmitter elements T3 and T4 are moved up a distance corresponding to the distance Hr between neighboring receiver element rows and to the left by a distance corresponding to dh. A row comprising fifth and sixth transmitter elements T5 and T6 is added at a distance 2Hr below T3 and T4 in the vertical direction, and by a distance 2dh in the horizontal direction. Therefore transmitter elements T2 and T3 are vertically aligned and transmitter elements T4 and T5 are vertically aligned.

The receiving antenna 720 comprises four receiver elements 34 arranged in two groups 780, 782 which are spaced by a distance Gw in the horizontal direction. Each group comprises two receiver elements 34. Within each group, the two receiver elements 34 are arranged in two rows with one receiver element 34 per row. The receiver elements 34 are arranged with horizontal positioning such that the vertical extent of each receiver element 34 does not overlap a receiver element 34 arranged above or below the first. In other words the receiving antenna 720 comprises four receiver elements 34 arranged in two groups of two rows with one receiver element 34 per row per group. The rows of receiver elements 34 are spaced apart vertically by a distance Hr.

Groups of receivers are horizontally aligned and the distance (Gw) between groups in the horizontal direction corresponds to four times the column spacing of receivers (dh).

Figure 18:
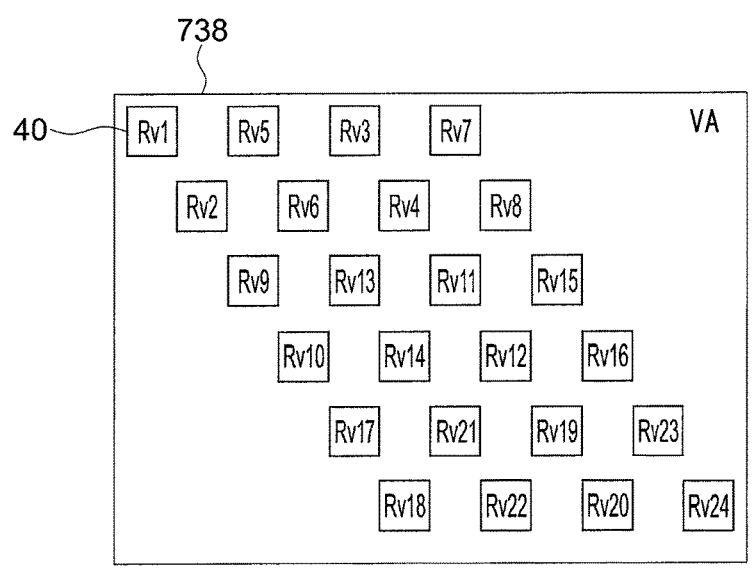
FIG. 18 is a diagram showing a virtual array of receivers according to the eighth embodiment of the disclosure.

FIG. 18 shows the virtual array 738 of virtual receiver elements 40 according to the eighth embodiment of the disclosure. As with the virtual array of the seventh embodiment, the virtual array according to the eighth embodiment comprises six rows of virtual receiver elements 40 wherein each row comprises four virtual receiver elements 40.

In addition to the advantages of the seventh embodiment, the further advantage of the eighth embodiment is as follows. By reducing the number of receiver elements 34, the receiving antenna 720 is reduced in size, while maintaining the same number of virtual antennas 40 as in the virtual array of the seventh embodiment.

As a modification to the eighth embodiment the number of virtual receiver elements 40 can be increased by providing the receiving antenna 720 with a third row of receiver elements 34 as in the receiving antenna 620 of the seventh embodiment. In this way the modification can be seen as a combination and adaptation of the transmitting antenna 716 of the eighth embodiment with the receiving antenna 620 of the seventh embodiment.

The radar apparatus 12 according to the disclosure is described on the basis of the above embodiments. However, the disclosure is not limited to the above-described embodiments, and may be implemented in various other embodiments without departing from the scope of the disclosure. For example, the following modifications may be made.

The disclosure is applicable to radar apparatuses looking in a different direction other than forward of the vehicle, e.g. rearward or to the left or right side of the vehicle. The radar apparatus 12 can be used for an adaptive cruise control (ACC) system.

The object reporting portion 60 according to the embodiments of the disclosure has the function of detecting, from the object data provided by the tracking portion, ghost objects which are signals from objects which are reflected off the road surface 7 and of removing these ghost objects from the object data. Optionally this function of object reporting portion 60 may be comprised in the AEBS 14.

The number of transmitter element 30 and the receiver element 34 is not limited by those shown in the embodiments mentioned above. Any number of the transmitter element 30 and the receiver element 34 may be provided in the antenna layout provided that it falls within the scope of the disclosure.

In the embodiments above, the transmitter element 30 and the receiver element 34 are disposed on a plane. However, the disclosure is not limited to this configuration. The transmitter element 30 and the receiver element 34 may be provided on different planes preferably parallel to each other.

Incidentally, the transmitting antenna 16 may correspond to an example of a transmitting portion. The receiving antenna 20 may correspond to a receiving portion.

According to a first aspect of the disclosure, a radar apparatus comprises: transmitting portion including a plurality of transmitter elements for emitting a transmitting signal as a radar wave toward an object; receiving portion including a plurality of receiver elements for receiving a reflection signal which is a reflection of the transmitting signal by the object; portion for generating a virtual receiving array including virtual receiver elements whose number corresponds to the number of receiver elements multiplied by the number of transmitter elements; portion for dividing the virtual receiving array into a plurality of identical sub-arrays; portion for generating covariance matrix data for each of the sub-arrays based on the reflection signal; portion for spatially smoothing the reflection signal by means of averaging the covariance matrix data for each of the sub-arrays to decorrelate the direct reflection signal from the object and multipath reflection signal among the reflection signal; portion for resolving the direct reflection signal from the object and multipath reflection signal based on the result of spatial smoothing of the reflection signal; and portion for determining the direction of the object based on the direct reflection signal.

With this radar apparatus, reflection signals are able to be subsequently processed to create a virtual receiving array of receiver elements. The number of the virtual receiver elements in the virtual receiving array corresponds to the number of receiver elements multiplied by the number of transmitter elements. The virtual array of receiver elements is divided into identical sub-arrays which facilitates further signal processing of the reflection signals. Following the formation of sub-arrays, covariance matrix data for each of the sub-arrays are generated based on the reflection signal. The covariance matrix data are spatially smoothed by means of averaging to decorrelate the direct reflection signal from the object and multipath reflection signal among the reflection signal. As a result, the direct reflection signal from the object and multipath reflection signal are resolved. Therefore, it is possible to estimate the directions of arrival of a plurality of objects with higher resolution.

A second aspect of the disclosure, preferably according to the first aspect, comprises an antenna layout for a radar apparatus, comprising the transmitting portion comprising at least two transmitter elements, and the receiving portion comprising at least three receiver elements which are arranged in at least two rows in a first direction and at least three columns in a second direction perpendicular to the first direction, wherein the respective distance in the first direction between neighboring ones of all of the at least two transmitter elements corresponds to the respective distance in the first direction between neighboring ones of all receiver elements in neighboring rows multiplied by the number of rows of receiver elements.

With an antenna layout according to the second aspect of the disclosure, it is possible to generate the virtual array of receiver elements in which the vertical extent of the virtual array is greater than the vertical extent of the real receiving antenna. Therefore resolution in the vertical direction is improved. The virtual receiving array is generated that comprises more receiver elements than the real receiver array alone and the effective aperture size of the receiving antenna is increased. Therefore the size and complexity of the radar apparatus is reduced. In addition the vertical extent of the each receiver element in the virtual array is not limited by neighbouring receiver elements.

A third aspect of the disclosure comprises an antenna layout according to the second aspect wherein, in the case of an odd number of receiver elements, the transmitter elements are provided in the same column.

With an antenna layout according to the third aspect, it is possible to create a virtual array of receiver elements using an odd number of real receiver elements wherein the virtual array has a regular structure. This makes further signal processing of the received signals easier. As is the case with the previous aspects, it is possible to generate a virtual array of receiver elements wherein the vertical extent of each receiver element is not limited by the receiver element above or below it and aperture size can be kept large.

A fourth aspect of the disclosure comprises an antenna layout according to the second aspect wherein, in the case of an even number of receiver elements, the respective distance in the second direction between neighboring ones of all of the at least two transmitter elements in neighboring rows corresponds to the respective distance in the second direction between neighboring receiver elements in different rows multiplied by the number of rows of receiver elements.

A fifth aspect of the disclosure comprises a radar apparatus according to the second aspect wherein, in the virtual receiving array, the number of virtual receiver elements is doubled in the first direction in comparison to the number of receiver elements in the receiving antenna in the first direction.

A sixth aspect of the disclosure has the further advantage that the number of virtual receiver elements in the virtual array is increased further which increases further the aperture size of the receiving antenna.

In a sixth aspect of the disclosure, preferably according to the second aspect, the transmitting portion includes at least two transmitter elements and the receiving portion includes at least two groups of receiver elements wherein each group has at least two receiver elements which are arranged in at least two rows in a first direction and at least two columns in a second direction perpendicular to the first direction, wherein the respective distance in the second direction between neighboring ones of all of the at least two transmitter elements in the same row corresponds to the twofold of the respective distance in the second direction between neighboring ones of all receiver elements in one group, and wherein the respective distance in the second direction in the same row between structurally corresponding receiver elements of neighboring groups of receiver elements corresponds to the respective distance in the second direction between neighboring ones of all of the at least two transmitter elements in the same row multiplied by the number of transmitter elements in one row. Preferably the number of receiver elements per group per row is one.

With an antenna layout according to the sixth aspect, the real receiver elements do not overlap. Therefore the vertical extent of each real receiver element is not limited. Furthermore due to the spacing between groups of real receiver elements, the average separation between receiver elements is larger and isolation of the receiver elements is increased. Furthermore it is possible to subsequently create a virtual receiving array of receiver elements wherein the number of virtual receiver elements in the virtual array is greater than the number of real receiver elements and the radar apparatus is kept small and of simple construction.

A seventh aspect of the disclosure comprises a radar apparatus according to the sixth aspect, wherein, in the virtual receiving array, the number of virtual receiver elements is doubled in the second direction in comparison to the number of receiver elements in the receiving antenna in the second direction The seventh aspect of the disclosure has the further advantage that the number of virtual receiver elements in the virtual array is increased further which improves the resolution performance of the radar apparatus.

An eighth aspect of the disclosure comprises a radar apparatus according to one of the first to seventh aspects, wherein the transmitter elements and the receiver elements are disposed in the same plane and the first direction is a vertical direction and a second direction is horizontal direction.

The eighth aspect of the disclosure has the advantage that a simple construction of the receiver and transmitting antennas is ensured and the signal processing is facilitated.

A ninth aspect of the disclosure comprises a radar apparatus according to one of the first to eight aspects additionally comprising means applying an eigenstructure technique to each of the covariance matrix data of the virtual receiving array for estimating the direction of arrival of signals.

The ninth aspect of the disclosure has the advantage that the directions of arrival of a plurality of objects can be detected by the radar apparatus with high resolution.

A tenth aspect of the disclosure provides a radar apparatus according to the thirteenth aspect, wherein the eigenstructure technique is the multiple signal classification (MUSIC) algorithm.

The tenth aspect of the disclosure has the advantage that the resolution of direction of arrival estimation is further increased.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A radar apparatus comprising:
a transmitting portion including a plurality of transmitter elements that emits a transmitting signal as a radar wave toward an object;
a receiving portion including a plurality of receiver elements receiving a reflection signal that is a reflection of the transmitting signal by the object; and
an estimation portion,
wherein:
the estimation portion generates a virtual receiving array including virtual receiver elements whose number corresponds to a total number of receiver elements multiplied by a total number of transmitter elements;
the estimation portion divides the virtual receiving array into a plurality of identical sub-arrays;
the estimation portion generates covariance matrix data for each of the sub-arrays based on the reflection signal;
the estimation portion averages the covariance matrix data for each of the sub-arrays to decorrelate a direct reflection signal from the object and multipath reflection signal among the reflection signal and spatially smooths the reflection signal;
the estimation portion resolves the direct reflection signal from the object and the multipath reflection signal based on the result of spatial smoothing of the reflection signal; and
the estimation portion determines the direction of the object based on the direct reflection signal.

2. The radar apparatus according to claim 1, wherein:
the transmitting portion includes at least two transmitter elements;
the receiving portion includes at least three receiver elements that are arranged in at least two rows in a first direction and at least three columns in a second direction perpendicular to the first direction; and
a first respective distance in the first direction between neighboring ones of all of the at least two transmitter elements corresponds to a second respective distance in the first direction between neighboring ones of all receiver elements in neighboring rows multiplied by a total number of rows of receiver elements.

3. The radar apparatus according to claim 2, wherein:
in a case of an odd number of receiver elements, the transmitter elements are provided in an identical column.

4. The radar apparatus according to claim 2, wherein:
in a case of an even number of receiver elements, a third respective distance in the second direction between neighboring ones of all of the at least two transmitter elements in neighboring rows corresponds to a fourth respective distance in the second direction between neighboring receiver elements in different rows multiplied by the number of rows of receiver elements.

5. The radar apparatus according to claim 2, wherein:
in the virtual receiving array, a total number of virtual receiver elements is doubled in the first direction in comparison to the number of receiver elements in a receiving antenna in the first direction.

6. The radar apparatus according to claim 1, wherein:
the transmitting antenna includes at least two transmitter elements;
a receiving antenna includes at least two groups of receiver elements wherein each group has at least two receiver elements that are arranged in at least two rows in a first direction and at least two columns in a second direction perpendicular to the first direction;
a first respective distance in the second direction between neighboring ones of all of the at least two transmitter elements in an identical same row corresponds to a twofold of a second respective distance in the second direction between neighboring ones of all receiver elements in one group; and a third respective distance in the second direction in an identical row between structurally corresponding receiver elements of neighboring groups of receiver elements corresponds to the first respective distance in the second direction between neighboring ones of all of the at least two transmitter elements in the identical row multiplied by the number of transmitter elements in one row.

7. The radar apparatus according to claim 6, wherein:
in the virtual receiving array, a total number of virtual receiver elements is doubled in the second direction in comparison to the number of receiver elements in the receiving antenna in the second direction.

8. The radar apparatus according to claim 1, wherein:
the transmitter elements and the receiver elements are disposed in an identical plane and the first direction is a vertical direction and a second direction is a horizontal direction.

9. The radar apparatus according to claim 1, wherein:
the estimation portion applies an eigenstructure technique to each of the covariance matrix data of the virtual receiving array.

10. The radar apparatus according to according to claim 9, wherein:
the eigenstructure technique is a multiple signal classification algorithm.

* * * * *